(12) United States Patent
Yamasaki

(10) Patent No.: US 10,728,476 B2
(45) Date of Patent: Jul. 28, 2020

(54) IMAGE PROCESSING DEVICE, IMAGE PROCESSING METHOD, AND IMAGE PROCESSING PROGRAM FOR DETERMINING A DEFECTIVE PIXEL

(71) Applicant: OLYMPUS CORPORATION, Hachioji-shi, Tokyo (JP)

(72) Inventor: Teruaki Yamasaki, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 55 days.

(21) Appl. No.: 16/224,375

(22) Filed: Dec. 18, 2018

(65) Prior Publication Data

US 2019/0149757 A1 May 16, 2019

Related U.S. Application Data

(63) Continuation of application No. PCT/JP2016/068686, filed on Jun. 23, 2016.

(51) Int. Cl.
| | |
|---|---|
| *H04N 9/64* | (2006.01) |
| *H04N 5/367* | (2011.01) |
| *H04N 1/40* | (2006.01) |
| *H04N 1/409* | (2006.01) |

(52) U.S. Cl.
CPC .............. *H04N 5/367* (2013.01); *H04N 1/40* (2013.01); *H04N 1/409* (2013.01); *H04N 5/3675* (2013.01)

(58) Field of Classification Search
CPC .............................. H04N 5/367; H04N 5/3675
See application file for complete search history.

(56) References Cited

U.S. PATENT DOCUMENTS

| | | | |
|---|---|---|---|
| 2012/0105689 A1 | 5/2012 | Kitani | |
| 2012/0281123 A1 | 11/2012 | Hoda et al. | |
| 2013/0242139 A1 | 9/2013 | Kitani | |

FOREIGN PATENT DOCUMENTS

| | | | |
|---|---|---|---|
| JP | 2004233448 A | 8/2004 | |
| JP | 2010068329 A | 3/2010 | |
| JP | 4453332 B2 | 4/2010 | |
| JP | 2011205586 A | 10/2011 | |
| JP | 2012095203 A | 5/2012 | |
| WO | 2011118329 A1 | 9/2011 | |

OTHER PUBLICATIONS

International Search Report (ISR) dated Sep. 6, 2016 issued in International Application No. PCT/JP2016/068686.
Written Opinion dated Sep. 6, 2016 issued in International Application No. PCT/JP2016/068686.

*Primary Examiner* — Gary C Vieaux
(74) *Attorney, Agent, or Firm* — Holtz, Holtz & Volek PC

(57) ABSTRACT

An image processing device includes a computer that is configured to: perform order-statistic filter processing on pixel values of individual pixels in a block including a pixel of interest and peripheral pixels in an acquired image; calculate a difference value between the pixel values of the pixel of interest before and after the order-statistic filter processing is performed; calculate a statistical variation of the pixel values of the peripheral pixels subjected to the order-statistic filter processing; and determine the pixel of interest as being a defective pixel in the case where a value obtained by dividing the difference value by the statistical variation is greater than or equal to a predetermined threshold.

8 Claims, 6 Drawing Sheets

IMAGE PROCESSING DEVICE, IMAGE PROCESSING METHOD, AND IMAGE PROCESSING PROGRAM FOR DETERMINING A DEFECTIVE PIXEL

CROSS-REFERENCE TO RELATED APPLICATIONS

This is a continuation of International Application PCT/JP2016/068686 which is hereby incorporated by reference herein in its entirety.

TECHNICAL FIELD

The present invention relates to image processing devices, image processing methods, and image processing programs.

BACKGROUND ART

In a known image processing method, in an image acquired by using a photographing device, such as a digital camera, the square root of the variance of the signal levels of a pixel of interest and eight peripheral pixels therearound, i.e., the standard deviation of these pixels, is calculated, a degree of prominence indicating how prominent the signal level of the pixel of interest is compared with the signal levels of the peripheral pixels is calculated, and the pixel of interest is determined to be a white defect in the case where the degree of prominence is greater than a predetermined upper limit, whereas the pixel of interest is determined to be a black defect in the case where the degree of prominence is less than a predetermined lower limit (e.g., see Patent Literature 1).

CITATION LIST

Patent Literature

{PTL 1}
Publication of Japanese Patent No. 4453332

SUMMARY OF INVENTION

An aspect of the present invention is an image processing device including a computer that is configured to: perform order-statistic filter processing on pixel values of individual pixels in a block including a pixel of interest and peripheral pixels in an acquired image; calculate a difference value between the pixel values of the pixel of interest before and after the order-statistic filter processing is performed; calculate a statistical variation of the pixel values of the peripheral pixels subjected to the order-statistic filter processing; and determine the pixel of interest as being a defective pixel in the case where a value obtained by dividing the difference value by the statistical variation is greater than or equal to a predetermined threshold.

Another aspect of the present invention is an image processing method including: performing order-statistic filter processing on pixel values of individual pixels in a block including a pixel of interest and peripheral pixels in an acquired image; calculating a difference value between the pixel values of the pixel of interest before and after the order-statistic filter processing is performed; calculating a statistical variation of the pixel values of the peripheral pixels subjected to the order-statistic filter processing; and determining the pixel of interest as being a defective pixel in the case where a value obtained by dividing the difference value by the statistical variation is greater than or equal to a predetermined threshold.

Another aspect of the present invention is a non-transitory computer-readable medium having an image processing program stored therein, the image processing program causing a computer to execute functions of: performing order-statistic filter processing on pixel values of individual pixels in a block including a pixel of interest and peripheral pixels in an acquired image; calculating a difference value between the pixel values of the pixel of interest before and after the order-statistic filter processing is performed; calculating a statistical variation of the pixel values of the peripheral pixels subjected to the order-statistic filter processing; and determining the pixel of interest as being a defective pixel in the case where a value obtained by dividing the difference value by the statistical variation is greater than or equal to a predetermined threshold.

BRIEF DESCRIPTION OF DRAWINGS

FIG. 2 shows an example of pixels subjected to order-statistic filter processing performed by using the image processing device in FIG. 1.

FIG. 3 shows an example in which pixels different from the pixels in FIG. 2 are subjected to the order-statistic filter processing.

DESCRIPTION OF EMBODIMENTS

An image processing device 1, an image processing method, and an image processing program according to a first embodiment of the present invention will be described below with reference to the drawings.

Figure 1:
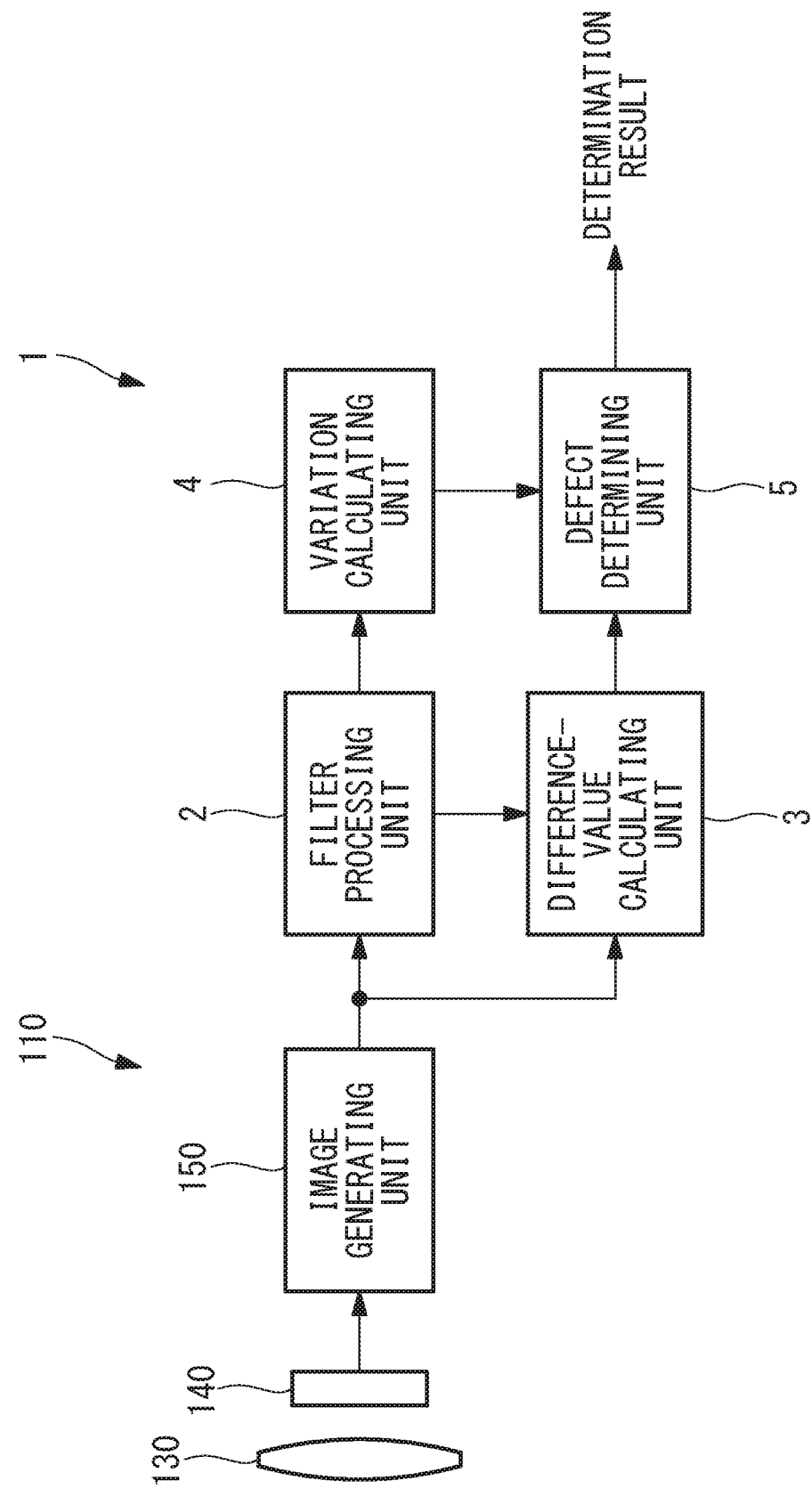
FIG. 1 is a block diagram showing a photographing device including an image processing device according to a first embodiment of the present invention.
Figure 4:
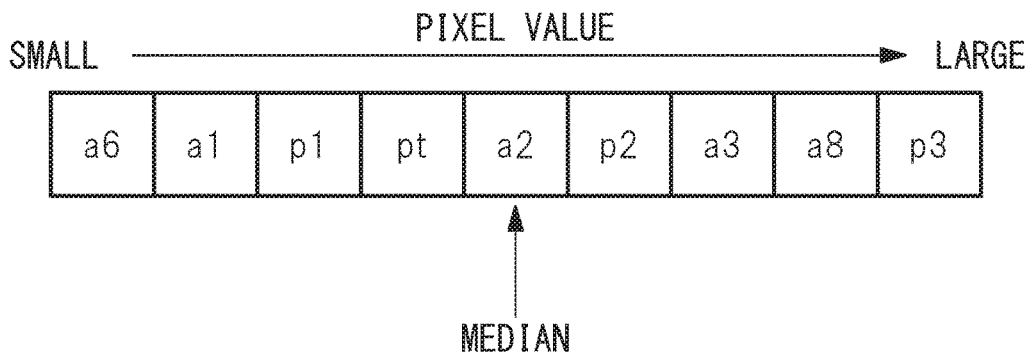
FIG. 4 shows an example in which the pixel values of the pixels in FIG. 3 are sorted by the magnitudes thereof after the order-statistic filter processing.

FIG. 1 shows a camera (photographing device) 100 including the image processing device 1 according to this embodiment.

The camera 100 includes an imaging unit 110 that photographs light coming from an object, the image processing device 1 according to this embodiment, and a display unit (not shown).

The imaging unit 110 includes a photographing lens 130 that collects light coming from an object, an imaging element 140 that photographs the light collected by the photographing lens 130, and an image generating unit 150 that generates an image on the basis of an image signal acquired by the imaging element 140.

The image processing device 1 according to this embodiment includes a filter processing unit 2, a difference-value calculating unit 3, a variation calculating unit 4, and a determining unit (defect determining unit) 5. The filter processing unit 2 performs order-statistic filter processing on an image input from the image generating unit 150. The difference-value calculating unit 3 calculates the difference value between the pixel values of a pixel of interest before and after the order-statistic filter processing by the filter processing unit 2. The variation calculating unit 4 calculates a statistical variation on the basis of pixel values after the order-statistic filter processing. The determining unit determines whether or not the pixel of interest is a defective pixel on the basis of the statistical variation calculated by the variation calculating unit 4 and the difference value calculated by the difference-value calculating unit 3.

The filter processing unit 2 performs order-statistic filter processing by using a median filter. For example, as shown in FIG. 2, in a block of 3×3=9 pixels consisting of a pixel of interest pt, indicated by hatching, and eight peripheral pixels p1 to p8 in the periphery of the pixel of interest pt, surrounded by a solid line, the filter processing unit 2 performs order-statistic filter processing for each of the pixel of interest pt and the peripheral pixels p1 to p8.

Figures 2, 3:
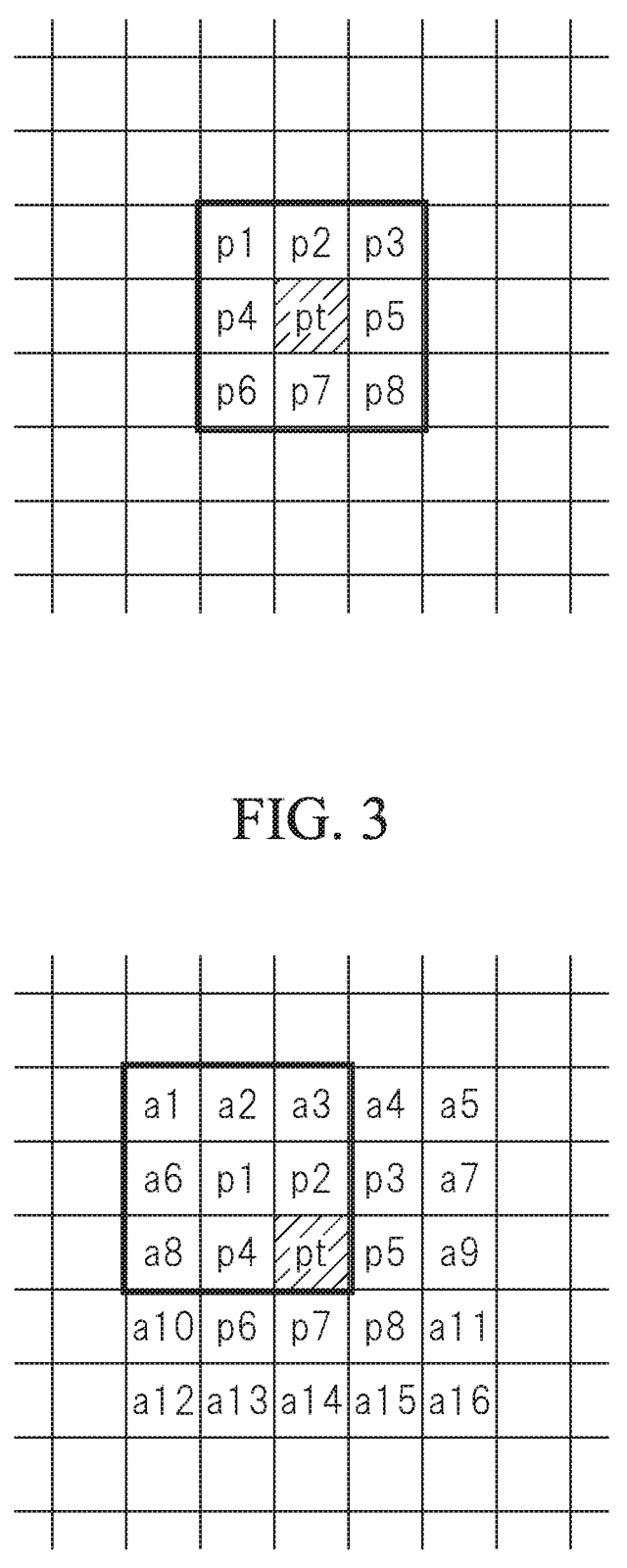

More specifically, when a pixel of interest pt is set, the filter processing unit 2 sorts the pixel values of 3×3=9 pixels centered at each of the pixel of interest pt and the peripheral pixels p1 to p8 by the magnitudes thereof and outputs the median values as the pixel values of the individual pixels, as shown in FIG. 3. For example, in the case where filter processing is performed for the pixel p1, processing is performed by using the pixel values of the pixels in the range of 3×3=9 pixels centered at the pixel p1, i.e., the pixels in the region surrounded by a thick line in FIG. 3. Furthermore, the pixel values of the individual pixels are sorted by the magnitudes thereof, and the median is output. The value at this time serves as the value P1 for the pixel p1 after the order-statistic filter processing. The filter processing unit 2 executes the above processing for all the pixels in the image.

In the case where the imaging element 140 has a Bayer pattern, the order-statistic filter processing is executed on pixels at which color filters for the same color are disposed.

Furthermore, although the pixel of interest is also used in the order-statistic filter processing here, it is not necessary to use the pixel of interest. In the case where the pixel of interest is not used, the number of pixels used is eight, which is an even number, and thus the median is calculated by averaging the pixel values of the fourth and fifth pixels.

The variation calculating unit 4 calculates the interquartile range as a statistical variation.

The interquartile range refers to the variation of a distribution in the case where the median is considered as the representative value of the distribution.

Figure 5:
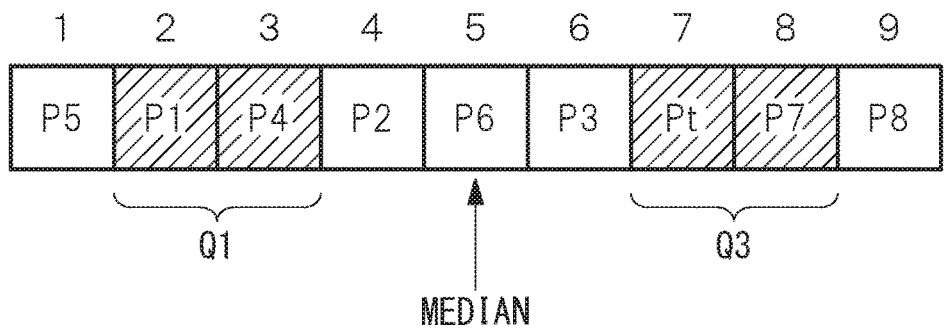
FIG. 5 shows an example in which the pixel values of the pixels in FIG. 2 are sorted by the magnitudes thereof after the order-statistic filter processing.

As shown in FIG. 5, the variation calculating unit 4 sorts, by the magnitudes thereof, the pixel values Pt and P1 to P8 of 3×3=9 pixels which are obtained by executing the order-statistic filter processing to each of the pixel of interest pt and the peripheral pixels p1 to p8.

The variation calculating unit 4 further calculates the individual medians of the sets of four pixel values on either side of the median P6 in the sorting result in FIG. 5. Since the number of data in each of the sets of pixel values on either side of the median P6 is four, the average of the second and third pixel values P1 and P4 and the average of the seventh and eighth pixel values Pt and P7 are considered as the medians.

The variation calculating unit 4 considers the median calculated from the second and third pixel values P1 and P4 as the first interquartile value Q1 and the median calculated from the seventh and eighth pixel values Pt and P7 as the third interquartile value Q3 and calculates the interquartile range IQR according to the following formula.

$$IQR = Q3 - Q1$$

The determining unit 5 divides the difference value calculated by the difference-value calculating unit 3 by the interquartile range calculated by the variation calculating unit 4, which represents a statistical variation, compares the resulting value with a predetermined threshold, and determines that the pixel of interest is a defective pixel if the value is greater than the threshold.

Since the interquartile range represents a variation, it is understood that the periphery of the pixel of interest is flat if the variation is small, whereas the periphery of the pixel of interest is not flat if the variation is large. By using the interquartile range as the denominator, it becomes possible to detect a defective pixel only in a region where the variation is small and thus the periphery is flat. Furthermore, since the difference value becomes large in the case where the pixel of interest is prominent, by using the difference value as the numerator, it becomes possible to readily determine the degree of prominence of the pixel of interest.

The following describes an image processing method employing the thus-configured image processing device 1 according to this embodiment.

Figure 6:
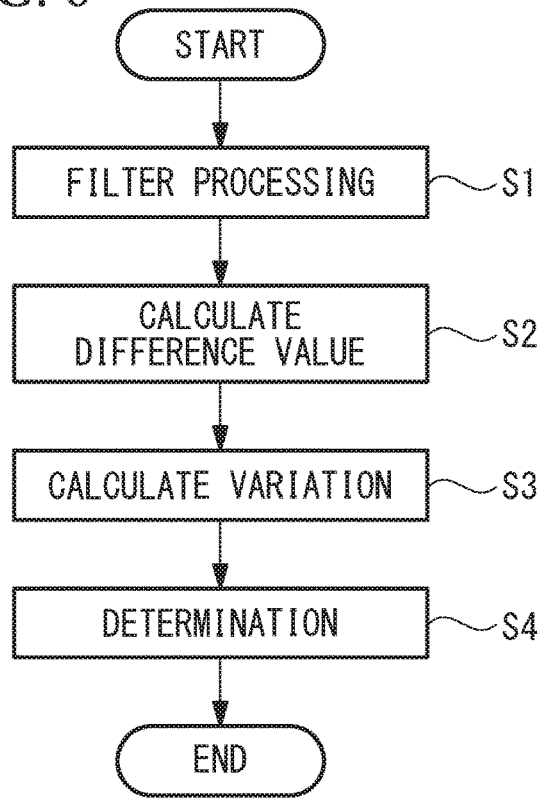
FIG. 6 is a flowchart showing an image processing method executed by using the image processing device in FIG. 1.

As shown in FIG. 6, the image processing method according to this embodiment includes a filter processing step S1 of performing order-statistic filter processing on the pixel values of the individual pixels in a block consisting of a pixel of interest and peripheral pixels in an acquired image, a difference-value calculating step S2 of calculating the difference value between the pixel values of the pixel of interest before and after the order-statistic filter processing is performed, a variation calculating step S3 of calculating a statistical variation of the pixel values of the peripheral pixels subjected to the order-statistic filter processing, and a determining step S4 of determining that the pixel of interest is a defective pixel in the case where a value obtained by dividing the difference value by the statistical variation is greater than or equal to a predetermined threshold.

With the image processing device 1 and the image processing method according to this embodiment, by performing order-statistic filter processing such as median filter processing, an advantage is afforded in that it is possible to reduce the effects of prominent pixel values attributable to noise and the pixel values of other defective pixels in the case where a plurality of defective pixels exist, thereby improving the accuracy of detecting defective pixels.

Furthermore, since a value obtained by dividing the difference value between the pixel values before and after the order-statistic filter processing by a statistical variation calculated from the peripheral pixels after the order-statistic filter processing is evaluated against a threshold instead of simply evaluating the difference value against a threshold, an advantage is afforded in that it is possible to suppress incorrect detection in the case where a pixel of interest is adjacent to an edge or is present on a texture.

Furthermore, with the image processing device 1 and the image processing method according to this embodiment, since the variation calculating unit 4 uses the interquartile range as a statistical variation, an advantage is also afforded in that it is possible to considerably reduce the amount of computation compared with the case where the standard deviation is used, which serves to reduce power consumption.

Next, an image processing device 10 according to a second embodiment of the present invention will be described below with reference to the drawings.

In the description of this embodiment, parts that are configured the same as those in the image processing device 1 according to the first embodiment described above will be designated by the same reference signs, and descriptions thereof will be omitted.

The image processing device 10 according to this embodiment differs from the image processing device 1 according to the first embodiment in that a video acquired by the imaging unit 110 is input.

Figure 7:
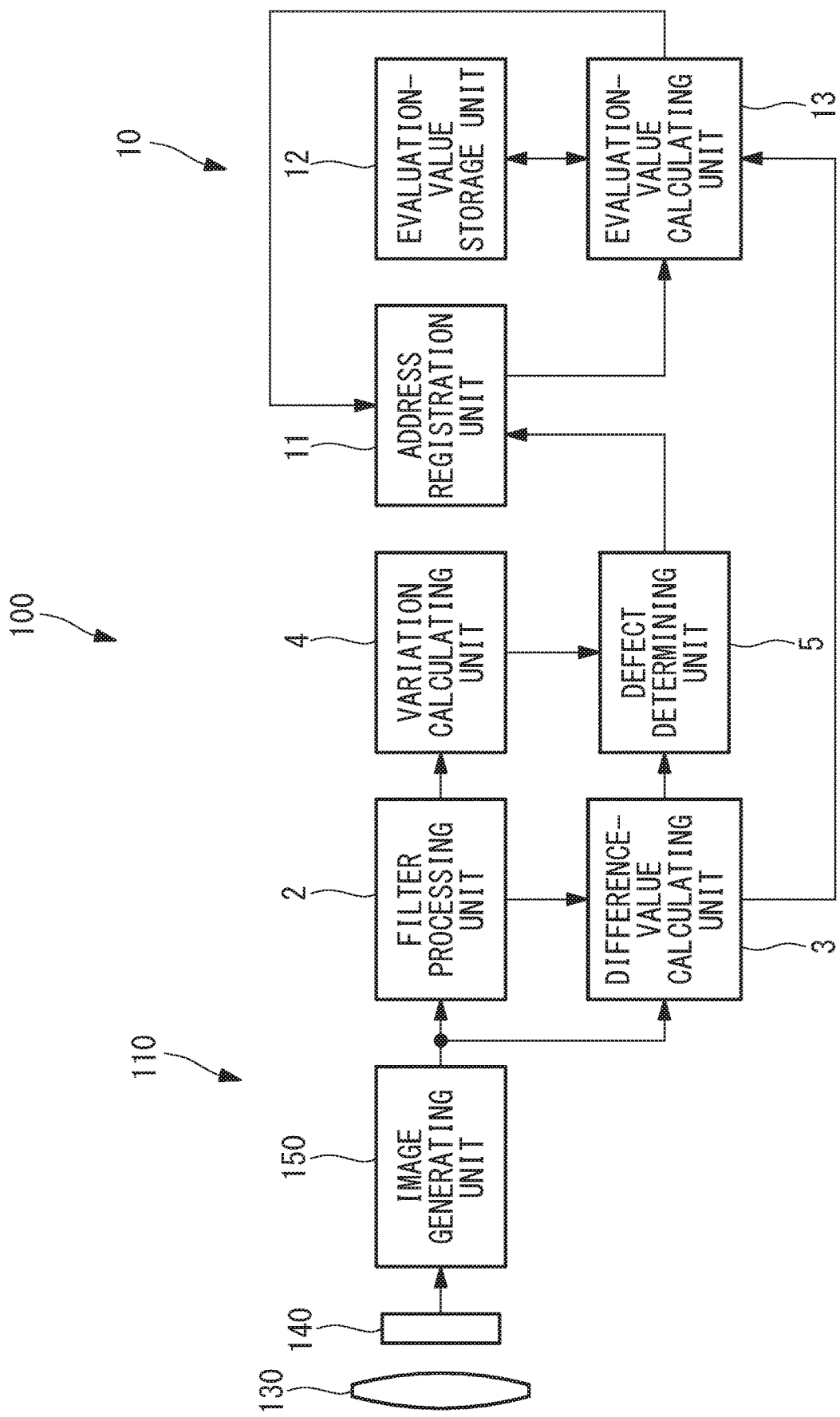
FIG. 7 is a block diagram showing a photographing device including an image processing device according to a second embodiment of the present invention.

As shown in FIG. 7, the image processing device 10 according to this embodiment includes an address registration unit 11 that registers the coordinate values of a pixel in the case where the pixel is determined as being a defective pixel by the determining unit 5, an evaluation-value storage unit 12 that stores an evaluation value calculated for a previous frame, and an evaluation-value calculating unit 13 that calculates an evaluation value on the basis of the stored evaluation value of the previous frame and a difference value. The address registration unit 11 revokes registration in accordance with the evaluation value calculated by the evaluation-value calculating unit 13.

Specifically, after the coordinate values of a defective pixel are registered by the address registration unit 11, image detection based on the registered pixel is no longer executed.

The evaluation-value calculating unit 13 calculates the evaluation value of the defective pixel on a per-frame basis according to the following formula.

$$vc=vb-vb*n+vn*n$$

Here, vc signifies an updated evaluation value, vb signifies the evaluation value of a previous frame, n signifies a coefficient, and vn signifies the difference value of the current frame. According to the above formula, the difference value in the current frame and the evaluation value of the previous frames are combined while applying weights thereto.

When calculating an evaluation value for the first time, since no evaluation value for the previous frame exists, an arbitrary value or the difference value may be set as an initial value.

The address registration unit 11 compares the evaluation value calculated by the evaluation-value calculating unit 13 with a threshold that may be set arbitrarily and determines that the pixel at the registered coordinates is not a defective pixel in the case where the evaluation value is less than or equal to the threshold, revoking registration of the coordinate values. In this case, the evaluation value becomes zero. In the case where the registration of the coordinate values is not revoked, the evaluation value is output as is and is stored in the evaluation-value storage unit 12.

With the thus configured image processing device 10 according to this embodiment, even if a pixel is determined as being a defective pixel as a result of incorrect detection and the address of the pixel is registered, it becomes apparent that the detection was incorrect as the processing for a plurality of frames proceeds, and the registration in the address registration unit 11 is revoked. Thus, it is possible to prevent a wasteful state in which the address of a non-defective pixel is kept registered without end. Furthermore, an advantage is also afforded in that it is possible to reduce the amount of memory prepared in advance for registering addresses.

Next, an image processing device 20 according to a third embodiment of the present invention will be described below with reference to the drawings.

In the description of this embodiment, parts that are configured the same as those in the image processing device 10 according to the second embodiment described above will be designated by the same reference signs, and descriptions thereof will be omitted.

Figure 8:
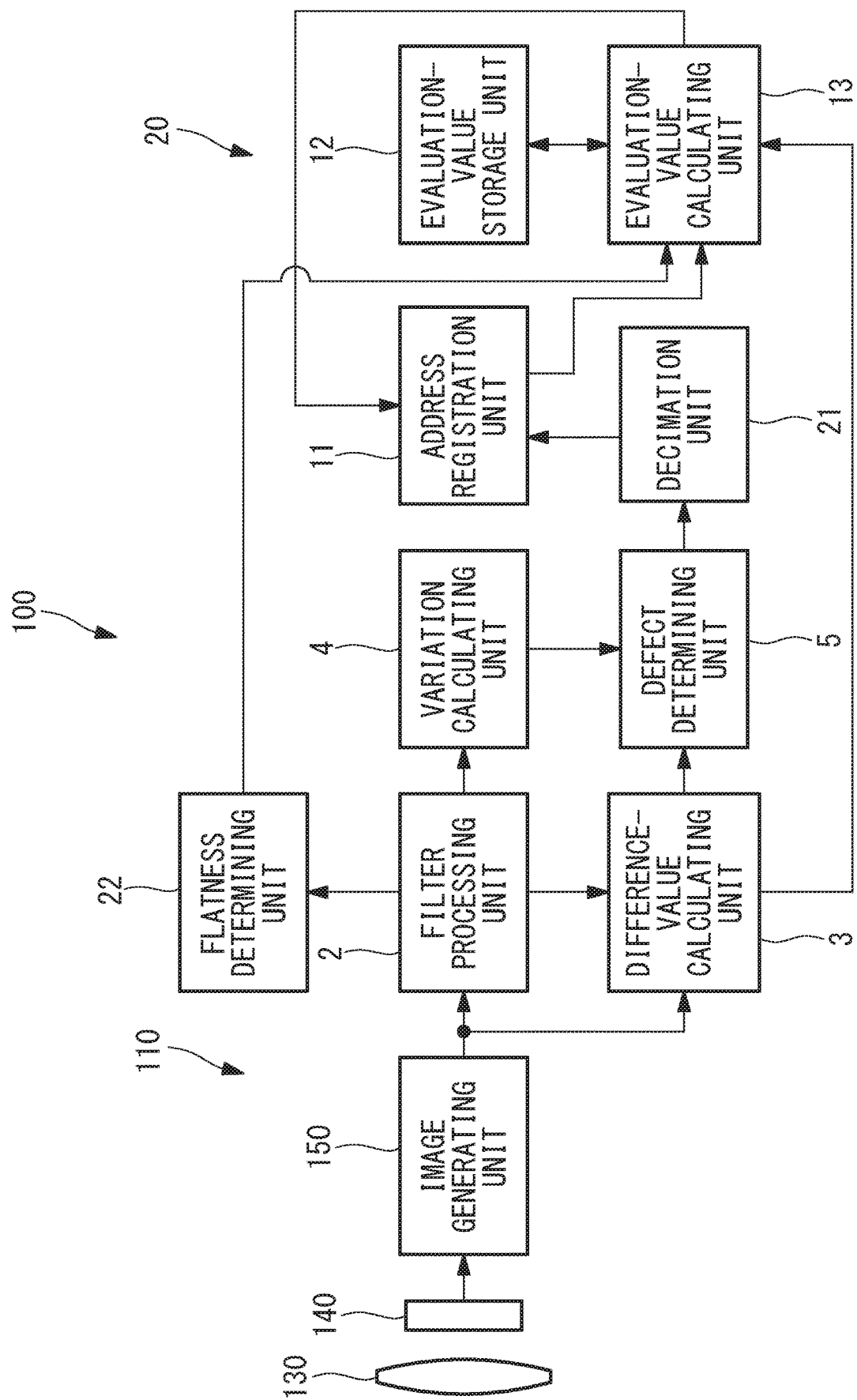
FIG. 8 is a block diagram showing a photographing device including an image processing device according to a third embodiment of the present invention.

As shown in FIG. 8, the image processing device 20 according to this embodiment differs from the image processing device 10 according to the second embodiment in that it includes a decimation unit 21 and a flatness determining unit 22.

The decimation unit 21 has a function for performing decimation such that the coordinate values of a defective pixel are registered in the address registration unit 11 at a rate of once every few times in the case where a pixel is determined as being a defective pixel by the determining unit 5.

Specifically, for example, each time a pixel is determined as being a defective pixel, the value of a counter is incremented, and registration in the address registration unit 11 is not executed in the case where the value of the counter is an even number. As another example, it is conceivable to register the pixel value of a defective pixel in the case where the value of the counter matches a number sequence N calculated according to the following formula. Although intervals of four are adopted in the following formula, intervals of two, three, or five or more may be adopted.

$$N=4*x+1, \text{ where } x=0, 1, 2, 3, \ldots$$

The flatness determining unit 22 compares the statistical variation of the pixel values of the peripheral pixels subjected to the order-statistic filter processing, output from the order-statistic filter, with a threshold and determines that the pixel is not flat in the case where the statistical variation exceeds the threshold.

Furthermore, for each pixel that is determined as not being flat by the flatness determining unit 22, the evaluation-value calculating unit 13 does not calculate an evaluation value, i.e., does not update the evaluation value.

In this case, a noise model of photon shot noise in a flat region for each pixel value is used so that a threshold will be calculated for each pixel value of pixels for which determination is performed. As the noise model, it is preferable to use a model having noise amounts in accordance with pixel values after the order-statistic filter processing. As the noise amounts, standard deviations or variances in flat regions of individual pixel values are generally used. In this case, however, interquartile ranges in flat regions for individual pixel values are used.

Figure 9:
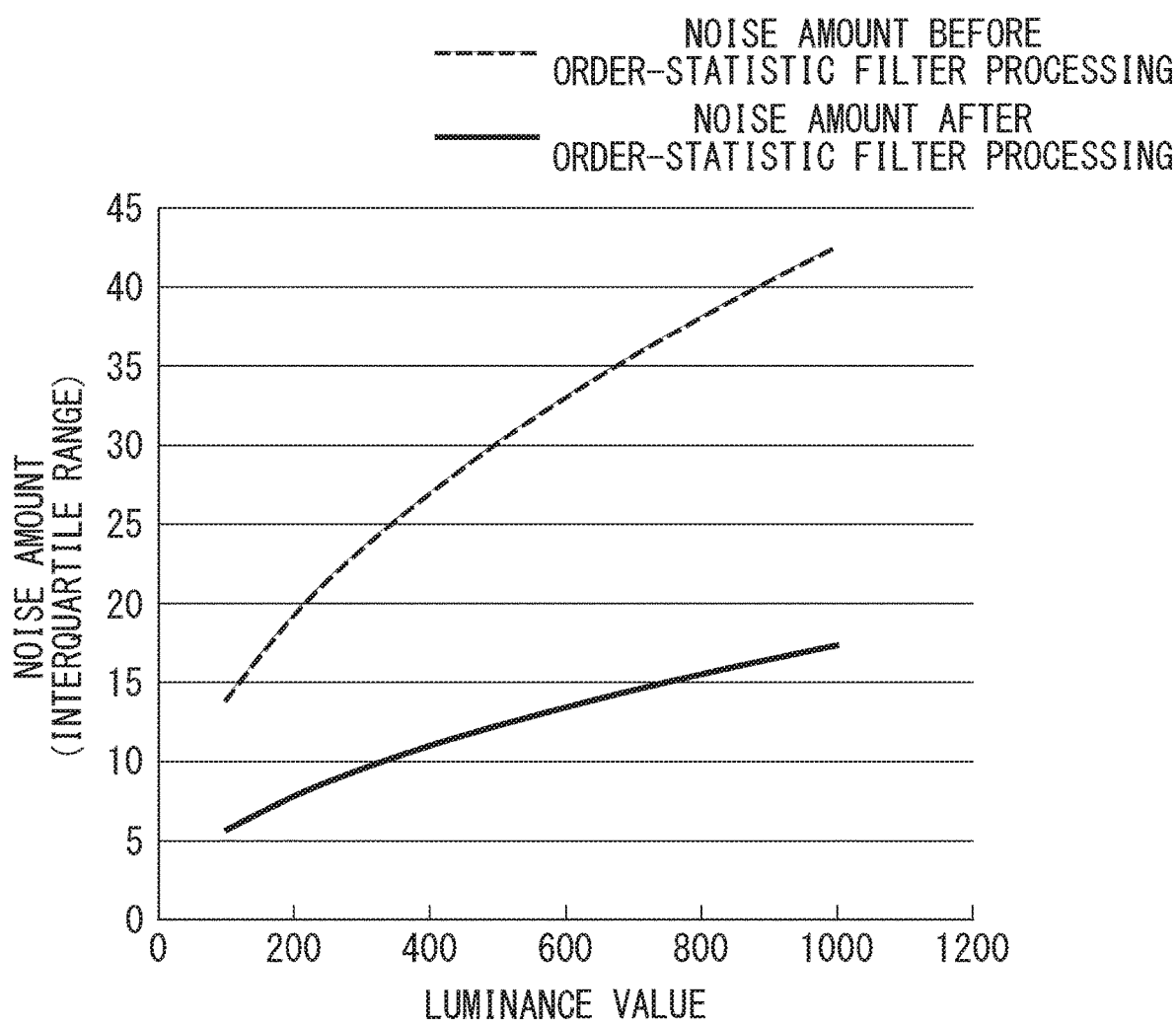
FIG. 9 is a graph showing noise amounts before and after order-statistic filter processing performed by using the image processing device in FIG. 8.

Since differences in noise amounts in the individual pixel values occur before and after the order-statistic filter processing, as shown in FIG. 9, a model calculated from the noise model may be multiplied by a coefficient that may be set arbitrarily, as in the following formula, thereby calculating a threshold to be actually used.

$$TH=MV*K$$

Here, TH signifies a threshold, MV signifies a model value, and K signifies a coefficient that may be set arbitrarily.

As described above, with the image processing device 20 according to this embodiment, instead of performing registration in the address registration unit 11 in all the cases where a pixel is determined as being a defective pixel by the determining unit 5, the decimation unit 21 decimates defective pixels to be registered. Thus, an advantage is afforded in that it is possible to reduce the number of defective pixels that are incorrectly detected. This makes it possible to reduce the amount of memory prepared in advance for registering addresses.

Furthermore, with the image processing device 20 according to this embodiment, for each pixel determined as not being flat by the flatness determining unit 22, an evaluation value is not calculated. This serves to suppress incorrect updating of evaluation values of defective pixels in rapidly changing scenes. Accordingly, an advantage is afforded in that it is possible to stably maintain the detected states of correctly detected pixels and to stably revoke the detected states of incorrectly detected pixels.

In the embodiments described above, processing based on a median filter is given as an example of order-statistic filter processing. Alternatively, it is possible to adopt: rank-order filter processing, in which the pixel value of a designated rank is selected from a set of sorted pixel values; α-trimmed average filter processing, in which a designated number of pixel values on both ends are excluded from a set of sorted pixel values and the average of the remaining pixel values is calculated; double-window modified trimmed average filter processing, in which pixel values included in a certain range of the median of a set of sorted pixel values are selected in addition to the median and the average of these pixel values is calculated; or processing in which a minimum value or a maximum value is selected in accordance with the size of a defective pixel.

Furthermore, although the interquartile range is given as an example of statistical variation, alternatively, the variance, standard deviation, average absolute difference, or range may be used. The range refers to the width of the distribution of pixel values of input pixels, i.e., the difference between the greatest pixel value and the smallest pixel value.

Furthermore, although the second and third embodiments have been described in the context of examples in which a video acquired by the imaging unit 110 is input, alternatively, the present invention may be applied to cases where a plurality of still pictures acquired in time series are input.

Furthermore, although the embodiments have been described in the context of configurations in which an image processing method is realized by hardware, the image processing method may be realized by an image processing program that can be executed by a computer. In this case, the computer includes a CPU, a main memory device such as a RAM, and a computer-readable recording medium, and an image processing program for realizing the processing described above is recorded in the recording medium. The CPU reads the image processing program recorded in the recording medium, which makes it possible to realize the same processing as the image processing device 1, 10, or 20.

Furthermore, although the embodiments have been described in the context of the case where the image processing device 1 is applied to the camera 100, alternatively, the image processing device 1 may be applied to any photographing device, such as a microscope or an endoscope.

The above-described embodiment also leads to the following invention.

An aspect of the present invention is an image processing device including a filter processing unit that performs order-statistic filter processing on pixel values of individual pixels in a block including a pixel of interest and peripheral pixels in an acquired image; a difference-value calculating unit that calculates a difference value between the pixel values of the pixel of interest before and after the order-statistic filter processing is performed by the filter processing unit; a variation calculating unit that calculates a statistical variation of the pixel values of the peripheral pixels subjected to the order-statistic filter processing by the filter processing unit; and a determining unit that determines the pixel of interest as being a defective pixel in the case where a value obtained by dividing the difference value calculated by the difference-value calculating unit by the statistical variation calculated by the variation calculating unit is greater than or equal to a predetermined threshold.

According to this aspect, the filter processing unit performs order-statistic filter processing on an acquired image, and the difference-value calculating unit calculates the difference value between the pixel values of a pixel of interest before and after the order-statistic filter processing. Meanwhile, the variation calculating unit calculates a statistical variation of the pixel values of peripheral pixel subjected to the order-statistic filter processing, and the determining unit determines whether or not a value obtained by dividing the difference value by the statistical variation is greater than or equal to a predetermined threshold. In the case where the value is determined as being greater than or equal to the threshold, the pixel of interest is determined as being a defective pixel.

In this case, according to this aspect, it is possible to determine whether or not the pixel of interest is a defective pixel without having to use an average. Therefore, the effects of other defective pixels are not involved even if a plurality of defective pixels exist in the same block, and it is possible to reduce the effects of noise even if noise exists, which serves to improve the accuracy of defect detection. In particular, since a standard deviation is not calculated, it is possible to accurately detect a defective pixel with a small amount of computation.

Furthermore, by evaluating the difference value between pixel values before and after the order-statistic filter processing in terms of the ratio thereof to a statistical variation calculated from peripheral pixels after the order-statistic filter processing instead of simply evaluating the difference value against a threshold, it is possible to suppress incorrect detection that occurs in the case where the pixel of interest is adjacent to an edge or is present on a texture.

In the above aspect, the variation calculating unit may calculate an interquartile range as the statistical variation.

This makes it possible to readily calculate a statistical variation.

Furthermore, in the above aspect, the image processing device may further include an address registration unit that registers the coordinate values of the pixel determined as being the defective pixel by the determining unit; an evaluation-value storage unit that stores an evaluation value of the defective pixel corresponding to the coordinate values registered in the address registration unit; and an evaluation-value calculating unit that calculates an evaluation value of the defective pixel on the basis of the difference value calculated by the difference-value calculating unit and the past evaluation value stored in the evaluation-value storage unit, and the address registration unit may revoke registration in the case where the evaluation value calculated by the evaluation-value calculating unit is less than or equal to a predetermined threshold.

Accordingly, even in the case where a pixel is determined as being a defective pixel as a result of incorrect detection, it is possible to revoke the defective pixel determination as the processing proceeds in the case where the pixel is not a defective pixel. This eliminates the need for preparing the same number of addresses as the number of pixels in the image in a detection memory.

Furthermore, in the above aspect, the evaluation-value calculating unit may calculate the evaluation value by combining the difference value and the past evaluation value while applying weights thereto.

Accordingly, even in the case where a non-defective pixel is determined as being a defective pixel as a result of incorrect detection, it is possible to revoke the defective pixel determination as the processing proceeds.

Furthermore, in the above aspect, the image processing device may further include a decimation unit that performs decimation for the registration of the coordinate values of the pixel determined as being the defective pixel by the determining unit in the address registration unit.

This makes it possible to reduce the incidence of incorrect defective pixel detection, which makes it possible to further reduce the amount of memory for registering the addresses of defective pixels.

Furthermore, in the above aspect, the evaluation-value calculating unit may cancel calculating the evaluation value in the case where the statistical variation of the pixel values of the peripheral pixels subjected to the order-statistic filter processing, calculated by the variation calculating unit, is greater than a predetermined threshold.

Accordingly, in the case where the statistical variation of the pixel values of the peripheral pixels subjected to the order-statistic filter processing is greater than the predetermined threshold, it is possible to determine that the distribution of the pixel values is not flat, and thus it is possible to prevent incorrect detection of a defective pixel by not calculating the evaluation value.

Another aspect of the present invention is an image processing method including a filter processing step of performing order-statistic filter processing on pixel values of individual pixels in a block including a pixel of interest and peripheral pixels in an acquired image; a difference-value calculating step of calculating a difference value between the pixel values of the pixel of interest before and after the order-statistic filter processing is performed in the filter processing step; a variation calculating step of calculating a statistical variation of the pixel values of the peripheral pixels subjected to the order-statistic filter processing in the filter processing step; and a determining step of determining the pixel of interest as being a defective pixel in the case where a value obtained by dividing the difference value calculated in the difference-value calculating step by the statistical variation calculated in the variation calculating step is greater than or equal to a predetermined threshold.

Another aspect of the present invention is an image processing program that causes a computer to execute a filter processing step of performing order-statistic filter processing on pixel values of individual pixels in a block including a pixel of interest and peripheral pixels in an acquired image; a difference-value calculating step of calculating a difference value between the pixel values of the pixel of interest before and after the order-statistic filter processing is performed in the filter processing step; a variation calculating step of calculating a statistical variation of the pixel values of the peripheral pixels subjected to the order-statistic filter processing in the filter processing step; and a determining step of determining the pixel of interest as being a defective pixel in the case where a value obtained by dividing the difference value calculated in the difference-value calculating step by the statistical variation calculated in the variation calculating step is greater than or equal to a predetermined threshold.

REFERENCE SIGNS LIST 1, 10, 20 Image processing device
2 Filter processing unit
3 Difference-value calculating unit
4 Variation calculating unit
5 Determining unit
11 Address registration unit
12 Evaluation-value storage unit
13 Evaluation-value calculating unit
21 Decimation unit
S1 Filter processing step
S2 Difference-value calculating step
S3 Variation calculating step
S4 Determining step

The invention claimed is:

1. An image processing device comprising:
a computer that is configured to:
perform order-statistic filter processing on pixel values of individual pixels in a block including a pixel of interest and peripheral pixels in an acquired image;
calculate a difference value between the pixel values of the pixel of interest before and after the order-statistic filter processing is performed;
calculate a statistical variation of the pixel values of the peripheral pixels subjected to the order-statistic filter processing; and
determine the pixel of interest as being a defective pixel in a case where a value obtained by dividing the difference value by the statistical variation is greater than or equal to a predetermined threshold.

2. The image processing device according to claim 1, wherein the computer is configured to calculate an interquartile range as the statistical variation.

3. An image processing device according to claim 1, wherein the computer is configured to:
register the coordinate values of the pixel determined as being the defective pixel;
store an evaluation value of the defective pixel corresponding to the registered coordinate values;
calculate an evaluation value of the defective pixel on the basis of the difference value and the stored past evaluation value; and
revoke registration in a case where the calculated evaluation value is less than or equal to a predetermined threshold.

4. The image processing device according to claim 3, wherein the computer is configured to calculate the evaluation value by combining the difference value and the past evaluation value while applying weights thereto.

5. The image processing device according to claim 3, wherein the computer is configured to perform decimation for the registration of the coordinate values of the pixel determined as being the defective pixel.

6. The image processing device according to claim 3, wherein the computer is configured not to calculate the evaluation value in a case where the statistical variation of the pixel values of the peripheral pixels subjected to the order-statistic filter processing is greater than a predetermined threshold.

7. An image processing method comprising:
performing order-statistic filter processing on pixel values of individual pixels in a block including a pixel of interest and peripheral pixels in an acquired image;
calculating a difference value between the pixel values of the pixel of interest before and after the order-statistic filter processing is performed;

calculating a statistical variation of the pixel values of the peripheral pixels subjected to the order-statistic filter processing; and determining the pixel of interest as being a defective pixel in a case where a value obtained by dividing the difference value by the statistical variation is greater than or equal to a predetermined threshold.

8. A non-transitory computer-readable medium having an image processing program stored therein, the image processing program causing a computer to execute functions of:

performing order-statistic filter processing on pixel values of individual pixels in a block including a pixel of interest and peripheral pixels in an acquired image;

calculating a difference value between the pixel values of the pixel of interest before and after the order-statistic filter processing is performed;

calculating a statistical variation of the pixel values of the peripheral pixels subjected to the order-statistic filter processing; and determining the pixel of interest as being a defective pixel in a case where a value obtained by dividing the difference value by the statistical variation is greater than or equal to a predetermined threshold.

* * * * *